United States Patent
Nakayama et al.

(10) Patent No.: US 7,316,864 B2
(45) Date of Patent: Jan. 8, 2008

(54) SLURRY COMPOSITION, ELECTRODE AND SECONDARY CELL

(75) Inventors: Akira Nakayama, Tokyo (JP); Takao Suzuki, Tokyo (JP); Hidekazu Mori, Tokyo (JP); Katsuya Nakamura, Tokyo (JP); Masahiro Yamakawa, Tokyo (JP)

(73) Assignee: Zeon Corporation, Tokyo (JP)

( * ) Notice: Subject to any disclaimer, the term of this patent is extended or adjusted under 35 U.S.C. 154(b) by 489 days.

(21) Appl. No.: 10/493,491

(22) PCT Filed: Oct. 25, 2002

(86) PCT No.: PCT/JP02/11075

§ 371 (c)(1),
(2), (4) Date: Oct. 8, 2004

(87) PCT Pub. No.: WO03/036744

PCT Pub. Date: May 1, 2003

(65) Prior Publication Data

US 2005/0069769 A1    Mar. 31, 2005

(30) Foreign Application Priority Data

Oct. 26, 2001 (JP) ............................. 2001-329072
Mar. 20, 2002 (JP) ............................. 2002-079576

(51) Int. Cl.
*H01M 4/62* (2006.01)
*H01M 4/88* (2006.01)

(52) U.S. Cl. .................................. 429/217; 252/182.1
(58) Field of Classification Search ............... 429/217, 429/231.7, 231.8, 242, 162, 188; 252/182.1
See application file for complete search history.

(56) References Cited

FOREIGN PATENT DOCUMENTS

| JP | 4-306560 A | 10/1992 |
|----|------------|---------|
| JP | 10-188991 A | 7/1998 |
| JP | 11-25989 A | 1/1999 |
| JP | 2000-344838 A | 12/2000 |
| JP | 2001-332265 A | 11/2001 |

*Primary Examiner*—Patrick Joseph Ryan
*Assistant Examiner*—Thomas H. Parsons
(74) *Attorney, Agent, or Firm*—Birch, Stewart, Kolasch & Birch, LLP

(57) ABSTRACT

A slurry composition for electrode comprising a binder, an active material, and a liquid medium, characterized in that the binder comprises a polymer (X) comprising 60 to 95 mole % of repeating units derived from acrylonitrile or methacrylonitrile and 5 to 30 mole % of repeating units derived from at least one kind of a monomer selected from 1-olefins and compounds represented by the following general formula (1): $CH_2=CR^1-COOR^2$ wherein $R^1$ represents a hydrogen atom or a methyl group and $R^2$ represents an alkyl group; and the liquid medium is capable of dissolving the polymer (X). The slurry composition allows the manufacture of a lithium ion secondary battery having enhanced capacity and good charge-discharge cycle characteristics and good charge-discharge rate characteristics.

15 Claims, No Drawings

SLURRY COMPOSITION, ELECTRODE AND SECONDARY CELL

TECHNICAL FIELD

This invention relates to a slurry composition for electrode, an electrode made using the slurry composition, and a secondary battery provided with the electrode.

BACKGROUND ART

In recent years, portable electronic appliances such as a notebook-sized personal computer, a cellular phone and a personal digital assistance have spread wide. Recently prolongation of service time of portable electronic appliances and shortening of charging time (i.e., improvement of rate characteristics) thereof are eagerly desired. To fulfill these desires, requirements for rendering high in performance of battery, especially enhancing the capacity and the rate of charge, are becoming severe.

A lithium ion secondary battery has a structure such that a positive electrode and a negative electrode with a separator interposed between the electrodes are placed together with an electrolyte liquid in a vessel. The positive electrode and the negative electrode are made by bonding an electrode active material (hereinafter referred to merely as "active material" when appropriate) and an optional electrical conductivity-imparting agent and other ingredients to a collector made of, for example, aluminum or copper through a binder for electrode (hereinafter referred to as "binder" when appropriate). The bonding of an electrode material to the collector is conducted by a procedure wherein an active material and other optional ingredients are mixed with a solution or dispersion of a binder in a liquid medium to prepare a slurry composition for an electrode of lithium ion secondary battery; a collector is coated with the slurry composition; and the liquid medium is removed from the thus-formed liquid coating, for example, by drying, to form a mixed material layer comprising the active material on the collector.

The capacity of a battery greatly depends upon the amount of an active material filled in the electrode. The rate characteristics of a battery vary depending upon the ease in movement of electrons, and the rate characteristics can be enhanced by an increase of the amount of an electrical conductivity-imparting agent such as carbon. To increase the amount of an active material and the amount of an electrical conductivity-imparting agent within a limited space of battery, the amount of a binder must be minimized. However, minimization of the amount of binder results in reduction of bonding force of the active material. Therefore, a binder exhibiting an enhanced bonding force even when it is used in a minor amount is eagerly desired.

Heretofore, a fluorine-containing polymer such as polyvinylidene fluoride has been widely used as a binder for a positive electrode of a lithium ion secondary battery. However, the fluorine-containing polymer does not have a sufficiently high bonding force and flexibility, and therefore, enhancement in the capacity of battery and the rate characteristics thereof is difficult to attain.

To remedy the drawbacks of a fluorine-containing polymer, a polymer rubber has been proposed as a binder in Japanese Unexamined Patent Publication No. H4-255670. A polymer rubber exhibits good bonding force and flexibility when an electrode is made using the polymer rubber, but, the cycle characteristics of battery are poor, and the capacity of battery is reduced and the rate characteristics are deteriorated, at repetition of a charge-discharge cycle. This would be due to the fact that the binder is swollen with an electrolyte liquid, and consequently, the bonding force of binder is gradually reduced and an active material tends to be separated from a collector, and the binder undesirably covers the entire surface of collector leading to reduction in a movement of electrons.

Thus, it has been difficult to enhance both of the capacity of battery and the rate characteristics thereof.

DISCLOSURE OF THE INVENTION

An object of the present invention is to provide a slurry composition containing a binder having a reduced degree of swelling with an electrolyte liquid and an enhanced bonding force; and an electrode made using the slurry composition.

Another object of the present invention is to provide a secondary battery having an enhanced capacity and good rate characteristics.

The present inventors have found that a binder comprised of a specific copolymer comprising acrylonitrile or methacrylonitrile units and specific 1-olefin in units or acrylic or methacrylic acid ester units has a reduced degree of swelling with an electrolyte liquid and an enhanced bonding force; and further that a lithium ion secondary battery manufactured using a slurry composition for electrode comprising the binder has an enhanced capacity and exhibits improved cycle characteristics and good rate characteristics, at repetition of a charge-discharge cycle. The present invention has been completed on the basis of these findings.

Thus, in accordance with the present invention, the following slurry compositions (1), (2), (3) and (4) are provided.

(1). A slurry composition for electrode comprising a binder, an active material for electrode, and a liquid medium, characterized in that the binder comprises a polymer (X) comprising 60 to 95% by mole of repeating units derived from acrylonitrile or methacrylonitrile and 5 to 30% by mole of repeating units derived from at least one kind of a monomer selected from 1-olefins and compounds represented by the following general formula (1):

$$CH_2=CR^1-COOR^2 \qquad (1)$$

wherein $R^1$ represents a hydrogen atom or a methyl group and $R^2$ represents an alkyl group; and the liquid medium is capable of dissolving the polymer (X).

(2). A slurry composition for an electrode as described above in (1), wherein the binder further comprises a polymer (Y) having a glass transition temperature in the range of −80 to 0° C. and containing not larger than 5% by weight of N-methyl-pyrrolidone-insoluble matter, and the ratio in content of the polymer (X) to the polymer (Y) is in the range of 1/10 to 10/1 by weight.

(3). A slurry composition for electrode as described above in (1), wherein the binder further comprises a polymer (Z) having a glass transition temperature in the range of −80 to 0° C. and containing at least 50% by weight of N-methyl-pyrrolidone-insoluble matter, and the ratio in content of the polymer (X) to the polymer (Z) is in the range of 1/10 to 10/1 by weight.

(4). A slurry composition for electrode as described above in (1), wherein the binder further comprises a polymer (Y) and a polymer (Z), and the ratio in content of the sum of the polymer (X) plus the polymer (Y) to the polymer (Z) is in the range of 5/1 to 1/5 by weight.

The above-mentioned slurry compositions (1) through (4) are preferably used for making a positive electrode of a lithium ion secondary battery.

The above-mentioned liquid medium is preferably N-methyl-pyrrolidone.

The above-mentioned polymer (Y) is preferably a hydrogenation product of an acrylonitrile-butadiene copolymer, and the above-mentioned polymer (Z) is preferably an acrylic rubber.

Further, in accordance with the present invention, the following electrodes (5), (6), (7) and (8) and a secondary battery (9) are provided.

(5). An electrode comprising a mixed material layer comprising at least a binder and an active material for electrode, which layer is bonded to a collector, characterized in that the binder comprises a polymer (X) comprising 60 to 95% by mole of repeating units derived from acrylonitrile or methacrylonitrile and 5 to 30% by mole of repeating units derived from at least one kind of a monomer selected from 1-olefins and compounds represented by the following general formula (1):

$$CH_2=CR^1-COOR^2 \qquad (1)$$

wherein $R^1$ represents a hydrogen atom or a methyl group and $R^2$ represents an alkyl group; and the liquid medium is capable of dissolving the polymer (X).

(6). An electrode as described above in (5), wherein the binder further comprises a polymer (Y) having a glass transition temperature in the range of –80 to 0° C. and containing not larger than 5% by weight of N-methyl-pyrrolidone-insoluble matter, and the ratio in content of the polymer (X) to the polymer (Y) is in the range of 1/10 to 10/1 by weight.

(7). An electrode as described in (5), wherein the binder further comprises a polymer (Z) having a glass transition temperature in the range of –80 to 0° C. and containing at least 50% by weight of N-methyl-pyrrolidone-insoluble matter, and the ratio in content of the polymer (X) to the polymer (Z) is in the range of 1/10 to 10/1 by weight.

(8). An electrode as described above in (5), wherein the binder further comprises a polymer (Y) and a polymer (Z), both of which are the same as mentioned above, and wherein the ratio in content of the sum of the polymer (X) plus the polymer (Y) to the polymer (Z) is in the range of 5/1 to 1/5 by weight.

(9). A secondary battery having an electrode as described above in any one of (5) to (8).

BEST MODE FOR CARRYING OUT THE INVENTION

The invention will be described in detail as for (1) the slurry composition for electrode, (2) the electrode and (3) the secondary battery.

(1) Slurry Composition for Electrode

The slurry composition for electrode (hereinafter referred to merely as "slurry composition" when appropriate) of the present invention comprises an active material for electrode, a binder for bonding the active material to a collector, and a liquid medium.

The binder in the slurry composition of the present invention comprises as an indispensable ingredient a polymer (X) comprising repeating units derived from acrylonitrile or methacrylonitrile and repeating units derived from at least one kind of a monomer (hereinafter referred to as "second monomer" when appropriate) selected from 1-olefins and compounds represented by the following general formula (1):

$$CH_2=CR^1-COOR^2 \qquad (1)$$

wherein $R^1$ represents a hydrogen atom or a methyl group and $R^2$ represents an alkyl group.

The amount of the repeating units derived from acrylonitrile or methacrylonitrile in the polymer (X) is in the range of 60 to 95% by mole, preferably 65 to 90% by mole, based on the total amount of polymer (X). If the amount of acrylonitrile or methacrylonitrile units is too small, the degree of swelling with an electrolyte liquid is large with the result of reduction of the retention of bonding force of binder and deterioration of the cycle characteristics of battery. In contrast, if the amount of acrylonitrile or methacrylonitrile units is too large, the bond properties of an active material become poor.

The amount of the repeating units derived from the second monomer in the polymer (X) is in the range of 5 to 30% by mole, preferably 10 to 25% by mole. If the amount of the second monomer units is too small, the bonding force of an active material becomes poor, and the slurry composition is difficult to uniformly coat on a collector. In contrast, if the amount of the second monomer units is too large, the bonding force of an active material tends to become poor, and the degree of swelling with an electrolyte liquid is liable to be large.

The process for producing the polymer (X) is not particularly limited. For example, acrylonitrile or methacrylonitrile can be copolymerized with the second monomer by a conventional polymerization procedure such as emulsion polymerization, suspension polymerization, dispersion polymerization, solution polymerization or bulk polymerization.

As specific examples of the 1-olefin used as a second monomer, there can be mentioned ethylene, propylene, 1-butene, 1-pentene, 3-methyl-1-butene and 1-hexene. Of these, 1-olefins having 2 to 4 carbon atoms such as ethylene, propylene and 1-butene are preferable. Ethylene is especially preferable.

As specific examples of the compound of formula (1) used as a second monomer, there can be mentioned acrylic acid alkyl esters such as methyl acrylate, ethyl acrylate, propyl acrylate, isopropyl acrylate, n-butyl acrylate, isobutyl acrylate, n-amyl acrylate, isoamyl acrylate, n-hexyl acrylate, 2-ethylhexyl acrylate and lauryl acrylate; and methacrylic acid alkyl esters such as methyl methacrylate, ethyl methacrylate, propyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate and lauryl methacrylate.

Of these, the compounds of formula (1) with $R^2$ having not larger than three carbon atoms are preferable. Methyl acrylate and methyl methacrylate are especially preferable.

The repeating units of a second monomer may also be formed by copolymerizing a conjugated diene monomer such as butadiene as a part of the raw material monomers, and hydrogenating the conjugated diene monomer units in the thus-obtained copolymer. As specific examples of the conjugated diene monmer, there can be mentioned 1,3-butadiene, 2-methyl-1,3-butadiene (i.e., isoprene), 2,3-dimethyl-1,3-butadiene and 1,3-pentadiene.

The second monomer forming the repeating units thereof may be used either alone or as a combination of at least two thereof.

The polymer (X) may comprise repeating units derived from other copolymerizable monomers provided that the polymer (X) can be dissolved in the liquid medium used in the slurry composition of the present invention.

As specific examples of such copolymerizable monomers, there can be mentioned acrylic acid alkyl esters and methacrylic acid alkyl esters, the alkyl group of which has a hydroxyl group, such as hydroxypropyl acrylate and hydroxypropyl methacrylate; crotonic acid esters such as methyl crotonate, ethyl crotonate, propyl crotonate, butyl crotonate, isobutyl crotonate, n-amyl crotonate, isoamyl crotonate, n-hexyl crotonate, 2-ethylhexyl crotonate and hydroxypropyl crotonate; methacrylic acid esters having an amino group such as dimethylaminoethyl methacrylate and diethylaminoethyl methacrylate; methacrylic acids esters having an alkoxyl group such as methoxypolyethylene glycol monomethacrylate; acrylic acid alkyl esters and methacrylic acid esters, which have an alkyl group with a substituent such as a phosphoric acid residue, a sulfonic acid residue and a boric acid residue; ethylenically monocarboxylic acids such as acrylic acid, methacrylic acid, crotonic acid and isocrotonic acid; and unsaturated dicarboxylic acids such as maleic acid, fumaric acid, citraconic acid, mesaconic acid, glutaconic acid and itaconic acid, and acid anhydrides thereof.

These copolymerizable monomers may be used either alone or as a combination of at least two thereof. The total amount of these monomers is not larger than 35% by mole and preferably not larger than 20% by mole.

The polymer (X) usually has a glass transition temperature (Tg) higher than 0° C., preferably in the range of 50 to 90° C. When the Tg of polymer (X) is too low, it is often difficult to enhance the electrode density to the desired extent by pressing an electrode.

The slurry composition for electrode of the present invention may comprise as a binder the polymer (X) alone, or other polymer, in addition to the polymer (X). The polymer which can be used in combination with the polymer (X) is not particularly limited. A preferable polymer used in combination with the polymer (X) is a polymer (Y) having a glass transition temperature (Tg) in the range of −80 to 0° C. and containing not larger than 5% by weight of N-methyl-pyrrolidone-insoluble matter (N-methyl-pyrrolidone is hereinafter abbreviated to as "NMP" when appropriate). The content of NMP-insoluble matter in the polymer (Y) is not larger than 5% by weight, preferably not larger than 3% by weight and more preferably not larger than 1% by weight. By the use of the polymer (Y) in combination with the polymer (X), solid content such as an active material in the slurry composition is not readily precipitated and the stability of the slurry composition is enhanced.

The content of NMP-insoluble matter is determined by a procedure wherein 0.2 g of a polymer is immersed in 20 milli-liter of NMP at a temperature of 60° C. for 72 hours, the immersed polymer is filtered through a sieve with 80 meshes, and the polymer residue on the sieve is dried and weighed. The content of NMP-insoluble matter is expressed by a ratio in % of the weight of the dried polymer to the weight of polymer as measured before the immersion in NMP.

The polymer (Y) has a Tg in the range of −80 to 0° C., preferably −60 to −5° C., and more preferably −40 to −10° C. If the Tg of polymer (Y) is too high, a mixed material layer comprised of polymer (Y) and an active material (which layer is hereinafter referred to as "mixed material layer" when appropriate), formed on a collector, has a poor flexibility, and, when a cycle of charge and discharge of a battery is repeated, cracks tend to occur in the mixed material layer and the active material is liable to be separated from the collector. In contrast, if the Tg of polymer (Y) is too low, the capacity of battery is liable to be reduced.

The monomer units constituting the polymer (Y) are not particularly limited, but a monomer not containing fluorine is preferably used. As specific examples of the monomer, there can be mentioned α-olefins such as ethylene, propylene, 1-butene, 1-pentene, isobutene and 3-methyl-1-butene; acrylic acid esters such as ethyl acrylate, n-propyl acrylate, butyl acrylate, isobutyl acrylate, n-octyl acrylate, 2-ethylhexyl acrylate, methoxyethyl acrylate and ethoxyethyl acrylate; methacrylic acid esters such as n-octyl methacrylate, n-decyl methacrylate and n-lauryl methacrylate; conjugated dienes such as 2-methyl-1,3-butadiene (i.e., isoprene), 2,3-dimethyl-1,3-butadiene, 1,3-pentadiene and 1,3-hexadiene; and unsaturated nitrile compounds such as acrylonitrile and methacrylonitrile.

The polymer (Y) may be a block copolymer or a random copolymer.

As specific examples of the polymer (Y), there can be mentioned an acrylonitrile-butadiene copolymer and its hydrogenation product, an ethylene-methyl acrylate copolymer, a butadiene-methyl acrylate copolymer, a styrene-butadiene copolymer, butadiene rubber, an ethylene-propylene-non-conjugated diene terpolymer (EPDM) and an ethylene-vinyl alcohol copolymer. Of these, a hydrogenation product of an acrylonitrile-butadiene copolymer is especially preferable.

The process for producing the polymer (Y) is not particularly limited. For example, a conventional polymerization procedure such as emulsion polymerization, suspension polymerization, dispersion polymerization or solution polymerization can be adopted.

Another preferable example of the polymer which can be used in combination with the polymer (X) is a polymer (Z) having a glass transition temperature (Tg) in the range of −80 to 0° C. and containing at least 50% by weight of NMP-insoluble matter. By using the polymer (Z), the total binder can be appropriately dissolved in a liquid medium to an extent such that the slurry composition has a high viscosity suitable for coating. Further, when the slurry composition is coated, undissolved binder portion in the binder keeps a fibrous or particulate form in the coating so that the surface of an active material is not completely covered with the binder, and a cell reaction is not prevented.

The polymer (Z) has a Tg in the range of −80 to 0° C., preferably −60 to −5° C., and more preferably −50 to −10° C. If the Tg of polymer (Z) is too high, an electrode has poor flexibility and, when a cycle of charge and discharge of a battery is repeated, an active material is liable to be separated from the collector. In contrast, if the Tg of polymer (Z) is too low, the capacity of battery is liable to be reduced.

The monomer units constituting the polymer (Y) are not particularly limited, and, monomers used for producing the polymer (X) and the polymer (Y) can also be used for producing the polymer (Z). As specific examples of the monomer for giving the polymer (Z) having the above-mentioned Tg, there can be mentioned acrylic acid esters such as ethyl acrylate, n-propyl acrylate, n-butyl acrylate, isobutyl acrylate, n-octyl acrylate and 2-ethylhexyl acrylate; methacrylic acid esters such as n-octyl methacrylate, n-decyl methacrylate and n-lauryl methacrylate; and conjugated dienes such as butadiene and isoprene.

The content of NMP-insoluble matter in the polymer (Z) is at least 50% by weight, preferably at least 60% by weight and more preferably at least 70% by weight. If the content of NMP-insoluble matter is too small, retention of bond properties of an active material is reduced and the capacity of battery tends to be reduced when a cycle of charge-discharge is repeated.

To give a polymer (Z) containing at least 50% by weight of NMP-insoluble matter, a polyfunctional ethylenically unsaturated monomer is preferably used as a part of the monomers for polymer (Z). The amount of the polyfunctional ethylenically unsaturated monomer is usually in the range of 0.1 to 10% by weight, preferably 0.5 to 5% by weight, based on the total monomers used for the polymer (Z).

As specific examples of the polyfunctional ethylenically unsaturated monomer, there can be mentioned divinyl compounds such as divinylbenzene, dimethacrylic acid esters such as ethylene dimethacrylate, diethylene glycol dimethacrylate and ethylene glycol dimethacrylate, trimethacrylic acid esters such as trimethylolpropane trimethacrylate; diacrylic acid esters such as diethylene glycol diacrylate and 1,3-butylene glycol diacrylate; and triacrylic acid esters such as trimethylolpropane triacrylate.

In the case when a conjugated diene such as butadiene or isoprene is copolymerized for the preparation of the polymer (Z), a crosslinked copolymer as the polymer (Z) can be obtained by appropriately choosing the polymerization conditions such as the polymerization temperature, the polymerization conversion and the amount of molecular weight modifier.

As specific examples of the polymer (Z) having the above-mentioned characteristics, there can be mentioned acrylic rubbers such as a 2-ethylhexyl acrylate-methacrylic acid-methacrylonitrile-diethylene glycol dimethacrylate copolymer, a butyl acrylate-acrylonitrile-diethylene glycol dimethacrylate copolymer and a butyl acrylate-acrylic acid-trimethylolpropane trimethacrylate copolymer; and diene rubbers such as an acrylonitrile-butadiene copolymer, butadiene rubber and a methyl methacrylate-butadiene copolymer. Of these, acrylic rubbers are preferable.

The polymer (Z) preferably has a particle diameter in the range of 0.005 to 1,000 μm, more preferably 0.01 to 100 μm and especially preferably 0.05 to 10 μm. If the polymer (Z) has too large particle diameter, the amount of binder is increased with the result in an increase of the internal resistance. In contrast, if the polymer (Z) has too small diameter, the active material surface is liable to be covered with the binder, leading to inhibition of cell reaction.

By the particle diameter as mentioned herein, we mean average particle diameter as determined as an arithmetic average value of particle diameter as measured using a transmission electron micrograph on 100 particles sampled in random.

The procedure for producing the polymer (Z) is not particularly limited, and the polymer (Z) can be produced by a conventional polymerization such as emulsion polymerization, suspension polymerization, dispersion polymerization or solution polymerization. An emulsion polymerization procedure is especially preferable because the diameter of polymers dispersed in a liquid medium can be easily controlled.

In the case when the polymer (Y) or the polymer (Z) is used in combination with the polymer (X), the relative amounts of these polymers are not particularly limited, but the ratios by weight of X/Y and X/Z are usually in the range of 1/10 to 10/1, preferably 1/5 to 5/1 and more preferably 1/3 to 3/1.

The three kinds of polymers (X), (Y) and (Z) may be used in combination. In this case, the ratio by weight of the sum of polymer (X) plus polymer (Y) to polymer (Z) is preferably in the range of 1/5 to 5/1, more preferably 1/3 to 3/1 and especially preferably 1/2 to 2/1. When the amount of polymer (Z) is too large, the binding force is increased, but the fluidity of a slurry composition is reduced and a mixed material layer formed on an electrode tends to have poor surface smoothness.

The amount of the total binders used in the present invention is preferably in the range of 0.1 to 5 parts by weight, more preferably 0.2 to 4 parts by weight and especially in the range of 0.5 to 3 parts by weight, based on 100 parts by weight of the active material. When the amount of the total binders is too small, an active material tends to be separated from an electrode. In contrast, when the amount of the total binders is too large, an active material is liable to be completely covered with the binder, leading to inhibition of cell reaction.

The liquid medium used for the slurry composition for a secondary battery electrode of the present invention is not particularly limited provided that it is capable of dissolving the polymer (X), but, the liquid medium preferably has a boiling point at normal pressure in the range of 80° C. to 350° C. and more preferably 100° C. to 300° C.

As specific examples of the liquid medium, amides such as N-methylpyrrolidone, N,N-dimethylacetamide and N,N-dimethyl-formamide can be mentioned. Of these, N-methylpyrrolidone is especially preferable in view of good coatability on a collector and good dispersibility of polymer (Z).

The amount of liquid medium in the slurry composition of the present invention is appropriately chosen depending upon the kind of a binder, an active material for electrode (mentioned below) and an electrical conductivity-imparting material so as to give a slurry composition having a viscosity suitable for coating. The total solid content of binder, active material for electrode, and electrical conductivity-imparting material in the slurry composition is preferably in the range of 50 to 95% by weight, more preferably 70 to 90% by weight.

The active material for electrode used in the slurry composition of the present invention is appropriately chosen depending upon the kind of an electrode and a capacitor. The slurry composition of the present invention can be used for the preparation of a positive electrode and a negative electrode. The slurry composition is preferably used for a positive electrode, especially preferably for a positive electrode of a lithium ion secondary battery.

In the case when the slurry composition is used for an electrode of a lithium ion secondary battery, any active material for electrode can be used provided that it is capable of being used for general lithium ion secondary batteries. As specific examples of the active material for a positive electrode, there can be mentioned lithium-containing composite metal oxides such as $LiCoO_2$, $LiNiO_2$, $LiMnO_2$ and $LiMn_2O_4$; transition metal sulfides such as $TiS_2$, $TiS_3$ and amorphous $MoS_3$; and transition metal oxides such as $Cu_2V_2O_3$, amorphous $V_2O$—$P_2O_5$, $MoO_3$, $V_2O_5$ and $V_6O_{13}$. Electrically conductive polymers such as polyacetylene and poly-p-phenylene can also be used as the active material for electrode.

As specific examples of the active material for a negative electrode, there can be mentioned carbonaceous materials such as amorphous carbon, graphite, natural graphite, mesocarbon micro-beads (MCMB) and pitch carbon fiber; and electrically conductive polymers such as polyacene. The shape and size of the active material are not particularly limited, and active materials having an electrical conductivity-imparting material deposited on the surface thereof by a mechanical modifying method can also be used.

In the case when the slurry composition is used for an electrochemical capacitor, any active material for electrode can be used provided that it is capable of being used for general electrochemical capacitor. As a specific example of the active material used for a positive electrode and a negative electrode, active carbon can be mentioned.

An electrical conductivity-imparting material can be incorporated in the slurry composition of the present invention, according to the need. As specific examples of the electrical conductivity-imparting material for a lithium ion secondary battery, carbon such as graphite and active carbon can be mentioned.

As specific examples of the electrical conductivity-imparting material for a nickel-hydrogen secondary battery, cobalt oxide is used for a positive electrode and nickel powder, cobalt oxide, titanium oxide and carbon are used for a negative electrode.

As specific examples of the carbon used for a lithium ion secondary battery and a nickel-hydrogen secondary battery, there can be mentioned acetylene black, furnace black, graphite, carbon fiber and fullerene. Of these, acetylene black and furnace black are preferable.

The amount of electrical conductivity-imparting material is usually in the range of 1 t 20 parts by weight, preferably 2 to 10 parts by weight, based on 100 parts by weight of the active material for electrode.

The above-mentioned slurry composition may comprise an additive such as a viscosity modifier and a fluidizing agent, according to the need.

The slurry composition for electrode of the present invention is prepared by mixing together the above-mentioned ingredients. The mixing procedure and mixing order are not particularly limited. For example, polymer (Z) is dispersed in a liquid medium, and polymer (X), polymer (Y), an active material for electrode and an electrical conductivity-imparting material are added to the dispersion of polymer (X), and the mixture is stirred by a mixer. The extent of dispersion can be determined by a particle gauge. Preferably the mixing for dispersion is carried out to an extent such that the dispersion does not contain agglomerates having a particle diameter larger than 100 μm. As specific examples of the mixer, there can be mentioned a ball mill, a sand mill, a pigment disperser, a pulverizer, an ultrasonic disperser, a homogenizer, a planetary mixer and a hovert mixer.

(2) Electrode

The electrode of the present invention comprises a mixed material layer comprising at least a binder and an active material for electrode, which layer is bonded to a collector.

The collector used is not particularly limited provided that it is composed of an electrically conductive material. The collector used for a lithium ion secondary battery is usually composed of metal such as iron, copper, aluminum, nickel or stainless steel. In the case when aluminum is used for a positive electrode and copper is used for a negative electrode, the binder contained in the slurry composition of the present invention manifests the most marked binding effect. The shape of a collector for a lithium ion secondary battery is also not particularly limited, and the collector is usually used in a sheet form having a thickness of about 0.001 to 0.5 mm.

The collector used for a nickel-hydrogen secondary battery includes, for example, punched metal, expanded metal, metallic wire, sintered metal body with network structure of fibrous metal and metal-plated resin plate.

The electrode of the present invention can be made by coating a collector with the slurry composition for electrode of the present invention, and drying the coating, whereby a mixed material layer comprising a binder and an active material for electrode, and optional ingredients such as an electrical conductivity-imparting material and a thickening agent, is bonded to the surface of collector.

The procedure of coating a collector with the slurry composition is not particularly limited. The collector can be coated with the slurry composition by a conventional coating procedure such as doctor-blade coating, dip coating, reverse-roll coating, direct-roll coating, gravure coating, extrusion coating and brush coating. The amount of the slurry composition applied is also not particularly limited, and is usually such that the thickness of the mixed material layer comprising an active material for electrode and a binder, formed by removing a liquid medium by drying a coating of the slurry composition, has a thickness of a range of 0.005 mm to 5 mm, preferably 0.01 mm to 2 mm. The procedure for drying an as-formed coating is not particularly limited, and includes, for example, warm-air drying, hot-air drying, low-humid-air drying, vacuum drying, infrared drying, far-infrared drying and electron radiation drying. The rate of drying should be chosen so that the liquid medium used is removed as soon as possible, but occurrence of stress crack in the mixed material layer due to stress concentration, and separation of the mixed material layer from the collector can be avoided.

The coated collector can be pressed, if desired, to enhance the density of the active material in an electrode. The pressing can be carried out, for example, by a mold pressing and a roll pressing.

(3) Secondary Battery

The secondary battery of the present invention comprises the above-mentioned electrode and an electrolyte solution, and, according to the need, a separator and other elements. The secondary battery can be manufactured by an ordinary procedure. For example, a positive electrode and a negative electrode are superposed with a separator interposed between the two electrodes, and the thus-formed assembly is wound or folded and then inserted into a vessel for battery. An electrolyte solution is introduced into the vessel, and then the vessel is sealed. According to the need, expanded metal, an over-current-preventing element such as a fuse or a PTC element, or a lead plate can be inserted to avoid a pressure increase within the battery and over-charge-discharge of the battery. The shape of the secondary battery is not particularly limited, and is, for example, coin-shape, button-shape, sheet-shape, cylindrical shape, rectangular shape and flat shape.

The electrolyte solution is in any form of gel or liquid. A suitable electrolyte solution can appropriately be chosen depending upon the particular active material used for a positive electrode or a negative electrode so as to obtain the desired battery performances.

The electrolyte for a lithium ion secondary battery includes known lithium salts. As specific examples of the electrolyte, there can be mentioned $LiClO_4$, $LiBF_4$, $LiPF_6$, $LiCF_3CO_2$, $LiAsF_6$, $LiSbF_6$, $LiB_{10}Cl_{10}$, $LiAlCl_4$, $LiCl$, $LiBr$, $LiB(C_2H_5)_4$, $LiCF_3SO_3$, $LiCH_3SO_3$, $LiC_4F_9S_3$, $Li(CF_3SO_2)_2N$ and lower aliphatic carboxylic acid lithium salt.

The liquid medium used for dissolving the electrolyte is not particularly limited, and, as specific examples of the liquid medium, there can be mentioned carbonates such as propylene carbonate, ethylene carbonate, butylene carbonate, dimethyl carbonate, ethylmethyl carbonate and diethyl carbonate; lactones such as γ-butyrolactone; ethers such as trimethoxymethane, 1,2-dimethoxyethane, diethyl ether, 2-ethoxyethane, tetrahydrofuran and 2-methyltetrahydrofuran; and sulfoxides such as dimethylsulfoxide. These liquid mediums may be used either alone or as a mixed liquid comprised of at least two kinds thereof.

The electrolyte for a nickel-hydrogen secondary battery includes, for example, a conventional aqueous potassium hydroxide solution having a concentration of 5 moles/liter or more.

The invention will now be described more specifically by the following working examples that by no means limit the scope of the invention. In the working examples, parts and % are by weight unless otherwise specified.

(1) Degree of Swelling of Polymer with Solvent in Electrolyte Solution

A solution of 0.2 g of a polymer in 10 milli-liter of N-methylpyrrolidone (NMP) was cast on a polytetrafluoroethylene sheet, and then dried to give a cast polymer film. A square specimen having a size of 4 cm$^2$, cut from the cast polymer film, was weighed (weight A), and then immersed in a solvent of an electrolyte solution at a temperature of 60° C. After 72 hours' immersion, the specimen was taken and immediately weighed (weight B). The degree of swelling of polymer with solvent in electrolyte solution was expressed by the ratio of weight B as measured after immersion to weight A as measured before immersion. As the solvent in an electrolyte solution, a mixed solvent comprised of ethylene carbonate, propylene carbonate, dimethyl carbonate, diethyl carbonate and ethylmethyl carbonate (1:1:1:1:1 by volume at 20° C.) was used.

(2) Content of Insoluble Matter in NMP 0.2 g of a polymer was immersed in 20 milli-liter of NMP at a temperature of 60° C. for 72 hours, and then, filtered through a sieve with 80 mesh size. The polymer on the sieve was dried and weighed. The content of insoluble matter in NMP was expressed by the ratio of the weight of polymer as measured after immersion and drying, to the weight of polymer as measured before immersion.

(3) Glass Transition Temperature (Tg)

Tg of polymer was measured using a differential scanning calorimeter (DSC) at a temperature elevation rate of 10° C./min.

(4) Particle Diameter

Particle diameter of a polymer was measured on 100 polymer particles sampled at random, using a transmission electron microscope. The particle diameter was expressed by the number average value of 100 particle diameters.

(5) Sedimentation in Slurry

A cylindrical glass bottle having a height of 40 mm and a volume of 5 ml was charged with a slurry composition so that the slurry composition in the bottle had a height of 25 mm. The bottle was sealed and allowed to stand for 24 hours. A 5 mm top part of the slurry was taken and the solid content is measured. The sedimentation in slurry was expressed by the change % of solid concentration which was calculated from the following equation.

Change percentage=[1−($C1/C2$)]×100 wherein C1 is a solid content in the 5 mm top part of slurry as measured after 24 hours' standing, and C2 is a solid content as measured on the initial slurry. The smaller the change percentage, the smaller the degree of sedimentation in slurry.

(6) Peel Strength

Manufacture of Positive Electrode

An aluminum foil having a thickness of 20 µm was uniformly coated with a slurry for positive electrode by a doctor blade. The coating was dried by a dryer at 120° C. for 45 minutes, and further dried under reduced pressure of 0.6 kPa MP at 120° C. for 2 hours. Then the coated foil was pressed by a twin-roll press to give a positive electrode having an electrode density of 3.3 g/cm$^3$.

Manufacture of Negative Electrode

A copper foil having a thickness of 18 µm was uniformly coated with a slurry for negative electrode by a doctor blade. The coating was dried in the same manner as in the positive electrode. The coated foil was pressed by a twin-roll press to a negative electrode having an electrode density of 1.4 g/cm$^3$.

Measurement of Peel Strength

Each of the above-mentioned positive electrode and negative electrode was cut into a rectangle with 2.5 cm width and 10 cm length, and a cellophane tape was adhered on the surface of the rectangular electrode. The electrode was fixed, and the peel strength was measured by peeling the tape at a peel angle of 180° and a peel rate of 50 mm/min. The measurement was made on 10 electrodes and the peel strength (N/cm) was expressed by the average value. With an increase in the peel strength, an active material for electrode becomes desirably difficult to separate from the collector.

(7) Capacity of Battery

Manufacture of Coin-shaped Battery for Evaluation of Positive Electrode

In the evaluation of a positive electrode, lithium metal was used as a negative electrode.

The positive electrode, manufactured by the method mentioned above in (6), was cut into a circular shape having a diameter of 15 mm. A battery was manufactured by using the circular positive electrode and a lithium metal negative electrode, and a separator. The separator was sandwiched between the positive electrode and the lithium metal negative electrode so that the two electrodes confronted to each other. The separator was comprised of a circular porous polypropylene film having a diameter of 18 mm and a thickness of 25 µm. An assembly composed of the positive electrode, the separator, and the negative electrode was placed in a coin-shaped outer casing having a diameter of 20 mm and a height of 1.8 mm and made of a stainless steel sheet having a thickness of 0.25 mm and having a packing made of polypropylene. An expanded metal part was placed on the side of lithium metal negative electrode opposite to the separator. An electrolyte solution was injected into the casing so that no air remains within the casing. A stainless steel cap having a thickness of 0.2 mm was placed on the thus-made assembly via a polypropylene packing. The stainless steel cap was fixed and the assembly-packed casing is sealed whereby a coin-shaped battery for evaluation of the positive electrode, having a diameter of 20 mm and a thickness of about 2 mm is obtained. The electrolyte solution is a solution of $LiPF_6$ with a concentration of 1 mol/liter in a mixed liquid composed of ethylene carbonate/ethylmethyl carbonate at a mixing ratio of 1:2 by volume at 20° C.

Manufacture of Coin-shaped Battery for Evaluation of Negative Electrode

In the evaluation of a negative electrode, lithium metal was used as a positive electrode.

The negative electrode, manufactured by the method mentioned above in (6), was cut into a circular shape having a diameter of 15 mm. A battery was manufactured by using the circular negative electrode and a lithium metal positive electrode, and a separator. The separator was sandwiched between the negative electrode and the lithium metal positive electrode so that the two electrodes confronted to each other. An expanded metal part was placed on the side of lithium metal positive electrode opposite to the separator. By the same procedures as mentioned above for the manufacture of the coin-shaped battery for evaluation of positive electrode, a coin-shaped battery for evaluation of negative electrode was manufactured. The separator and coin-shaped outer casing were the same as those used for the manufacture of the coin-shaped battery for evaluation of positive electrode.

Measurement of Capacity of Battery

Using the coin-shaped batteries manufactured by the above-mentioned methods, the positive electrode and the negative electrode were evaluated to determine the capacity of battery. A charge-discharge test was carried out while a cycle of charge and discharge was repeated between 3V and 4.2V for the evaluation of a positive electrode and between 0V and 1.2V for the evaluation of a negative electrode, respectively, at a predetermined temperature and a constant current rate of 0.1 C. The measurement of battery capacity was carried out as the discharge capacity (initial discharge capacity) at the third cycle. The unit of capacity was mAh/g of active material.

(8) Charge-discharge Cycle Characteristics of Battery

In the same manner as the above-mentioned measurement of the initial discharge capacity, the discharge capacity at the third cycle and the discharge capacity at the 50th cycle were measured. The charge-discharge cycle characteristics were expressed by the ratio in percent of the discharge capacity at the 50th cycle to the discharge capacity at the third cycle. The larger this discharge capacity ratio, the smaller the reduction of battery capacity.

(9) Charge-discharge Rate Characteristics of Battery

In the same manner as the above-mentioned measurement of the initial discharge capacity, the discharge capacity at the third cycle was measured at a constant current rate of 1 C. The charge-discharge rate characteristics were expressed by the ratio in percent of the discharge capacity at the third cycle at a constant current rate of 1 C to the discharge capacity at the third cycle at a constant current rate of 0.1 C. The larger this discharge capacity ratio, the higher the charge-discharge rate.

The composition, production method and properties of polymers (X), polymers (Y) and polymers (Z), used as a binder, are shown in Tables 1, 2 and 3. Polymer (Y-1) in Table 2 is a hydrogenation product of acrylonitrile-butadiene copolymer rubber. Ethylene units in this hydrogenation product were formed by hydrogenation of butadiene units. Polyvinylidene fluoride (PVDF) shown in Table 5 was #1100 available from Kureha Chem. Ind. Co., (NMP-insoluble matter content: below 0.1% by weight).

TABLE 1

| | X-1 | X-2 | X-3 | X-4 | X-5 | X-6 | X-7 | X-8 | X-9 | X-10 | X-11 |
|---|---|---|---|---|---|---|---|---|---|---|---|
| Composition of polymer (mole %) | | | | | | | | | | | |
| Acrylonitrile | 78 | 85 | 91 | 82 | 78 | 78 | 87 | 89 | 80 | 82 | 84 |
| Ethylene | 22 | 15 | 9 | — | — | 15 | — | — | — | 18 | — |
| Propylene | — | — | — | 18 | — | — | — | — | — | — | 16 |
| 1-Butene | — | — | — | — | 22 | — | — | — | — | — | — |
| Methyl acrylate | — | — | — | — | — | 7 | 13 | — | 14 | — | — |
| Methyl methacrylate | — | — | — | — | — | — | — | 11 | 6 | — | — |
| Production method and properties of polymer | | | | | | | | | | | |
| Polym'n method *1 | sol | sol | sol | sol | sol | sol | sus | sus | sus | sol | sol |
| Tg(° C.) | 68 | 78 | 85 | 81 | 62 | 53 | 80 | 98 | 80 | 74 | 83 |
| SD in liq medium *2 | 1.5 | 1.3 | 1.3 | 1.6 | 1.7 | 1.8 | 1.7 | 1.7 | 1.9 | 1.5 | 1.6 |

| | X-12 | X-13 | X-14 | X-15 | X-16 | X-17 | X'-1 | X'-2 | X'-3 | X'-4 |
|---|---|---|---|---|---|---|---|---|---|---|
| Composition of polymer (mole %) | | | | | | | | | | |
| Acrylonitrile | 88 | 80 | 92 | 90 | 85 | 80 | 100 | 35 | 63 | 30 |
| Ethylene | — | — | — | 10 | — | — | — | — | 23 | — |
| Propylene | — | — | — | — | — | 20 | — | — | — | — |
| 1-Butene | 12 | — | — | — | — | — | — | — | — | — |
| Methyl acrylate | — | 20 | — | — | 15 | — | — | 42 | — | 40 |
| Methyl methacrylate | — | — | 8 | — | — | — | — | 23 | 14 | 30 |
| Production method and properties of polymer | | | | | | | | | | |
| Polym'n method *1 | emu | sus | sus | sol | sol | sol | sus | sus | sol | sus |
| Tg(° C.) | 78 | 72 | 98 | 86 | 78 | 80 | 97 | 59 | 73 | 63 |
| SD in liq medium *2 | 1.6 | 1.8 | 1.4 | 1.3 | 1.8 | 1.7 | 1.1 | 7.2 | 5.7 | 9.6 |

*1 Polymerization method, sol: solution polymerization, sus: suspension polymerization, emu: emulsion polymerization
*2 Swelling degree of polymer with liquid medium for electrolyte

TABLE 2

| | Y-1 | Y-2 | Y-3 | Y-4 |
|---|---|---|---|---|
| Composition of polymer (mole %) | | | | |
| Ethylene | 75 | 45 | — | — |
| Butadiene | — | — | 60 | — |
| Methyl acrylate | — | 55 | 40 | — |
| 2-Ethylhexyl acrylate | — | — | — | 68 |

TABLE 2-continued

|  | Y-1 | Y-2 | Y-3 | Y-4 |
|---|---|---|---|---|
| Methacrylic acid | — | — | — | 6 |
| Styrene | — | — | — | 26 |
| Acrylonitrile | 25 | — | — | — |
| Properties of polymer | | | | |
| Tg(° C.) | −22 | −13 | −10 | −43 |
| NMP-insoluble *1 (%) | <0.1 | <0.1 | <0.1 | <0.1 |

*1 Content of NMP-insoluble matter

TABLE 3

|  | Z-1 | Z-2 | Z-3 | Z-4 | Z-5 | Z-6 | Z-7 | Z-8 | Z-9 |
|---|---|---|---|---|---|---|---|---|---|
| Composition of polymer (mole %) | | | | | | | | | |
| Ethyl acrylate | — | — | — | 70 | — | — | — | — | — |
| Butyl acrylate | — | 55 | — | — | 82 | — | — | — | — |
| 2-Ethylhexyl acrylate | 72 | — | — | — | — | 76 | 62 | 72 | 76 |
| Methyl methacrylate | — | — | — | — | — | — | 15 | — | — |
| Acrylonitrile | — | 44 | 61 | — | 15 | — | — | — | 20 |
| Methacrylonitrile | 20 | — | — | — | — | 20 | 20 | 25 | — |
| Methacrylic acid | 7 | — | — | — | 2 | 3 | 2 | — | — |
| Styrene | — | — | — | 28 | — | — | — | — | — |
| Butadiene | — | — | 38.9 | — | — | — | — | — | — |
| Diethylene glycol dimethacrylate | 1 | 1 | — | 2 | 1 | 1 | 1 | 3 | 4 |
| Trimethylenepropane trimethacrylate | — | — | 0.1 | — | — | — | — | — | — |
| Properties of polymer | | | | | | | | | |
| Tg(° C.) | −47 | −42 | −25 | 15 | −40 | −47 | −30 | −51 | −54 |
| NMP-insoluble *1 (%) | 85 | 89 | 86 | 98 | 88 | 85 | 82 | 95 | 97 |
| Particle diameter (μm) | 0.20 | 0.20 | 0.08 | 0.13 | 0.12 | 0.15 | 0.16 | 0.23 | 0.12 |

*1 Content of NMP-insoluble matter

EXAMPLE 1

To a solution of 1.5 parts of polymer (X-1) in NMP, 100 parts of lithium cobaltate (LiCoO$_2$) as active material for electrode and 3 parts of acetylene black (HS-100 available from Denki Kagaku Kogyou K.K.) as electrical conductivity-imparting agent were added, and NMP was further added in an amount such that the mixture had a solid content of 77%. The mixture was stirred by a planetary mixer to give a uniform slurry for positive electrode. Using the slurry, a positive electrode, and further a secondary battery were manufactured. Peel strength of the electrode, and properties of the secondary battery were evaluated at 20° C. The results are shown in Table 4.

EXAMPLES 2-8, COMPARATIVE EXAMPLES 1-3

By the same procedures as described in Example 1, slurry compositions were prepared except that polymers shown as polymer (X) in Table 4 were used with all other conditions remaining the same. Using the slurry compositions, positive electrodes and further secondary batteries were manufactured. Properties of the electrodes and the secondary batteries were evaluated. The results are shown in Table 4.

EXAMPLE 9

To a solution of 5 parts of polymer (X-9) in NMP, 95 parts of MCMB as active material for electrode was added, and NMP was further added in an amount such that the mixture had a solid content of 68%. The mixture was stirred to give a uniform slurry for negative electrode. Using the slurry, a positive electrode, and further a secondary battery were manufactured. Peel strength of the electrode, and properties of the secondary battery were evaluated at 25° C. The results are shown in Table 4.

TABLE 4

|  | Example | | | | | | | | | Comp. Ex. | | |
|---|---|---|---|---|---|---|---|---|---|---|---|---|
|  | 1 | 2 | 3 | 4 | 5 | 6 | 7 | 8 | 9 | 1 | 2 | 3 |
| Kind of polymer | X-1 | X-2 | X-3 | X-4 | X-5 | X-6 | X-7 | X-8 | X-9 | X'-1 | X'-2 | X'-3 |
| Kind of electrode *1 | P | P | P | P | P | P | P | P | N | P | P | P |
| Peel strength (N/cm) | 0.27 | 0.24 | 0.23 | 0.28 | 0.27 | 0.28 | 0.24 | 0.22 | 0.23 | 0.10 | 0.12 | 0.15 |
| Battery capacity (mAh/g) | 142 | 144 | 144 | 143 | 143 | 141 | 142 | 141 | 330 | 138 | 121 | 126 |
| Cycle characs *2 (%) | 67 | 64 | 61 | 66 | 67 | 67 | 63 | 61 | 63 | 38 | 34 | 40 |
| Rate characs *3 (%) | 48 | 41 | 42 | 44 | 46 | 43 | 44 | 41 | 42 | 28 | 21 | 24 |

*1 P: positive electrode, N: negative electrode
*2 Charge-discharge cycle characteristics of battery
*3 Charge-discharge rate characteristics of battery

EXAMPLE 10

To a solution of 0.6 parts of polymer (Y-1) in NMP, 3 parts of acetylene black (HS-100 available from Denki Kagaku Kogyou K.K.) as electrical conductivity-imparting agent was added, and the mixture was stirred by a pigment dispersing apparatus. NMP was added to prepare a carbon coating liquid having a solid content of 35%.

100 parts of lithium cobaltate and a solution of 0.2 part of polymer (X-15) in NMP were placed in a planetary mixer equipped with two pairs of hook-type rotor blades. Further, 12.8 parts of the above-mentioned carbon coating liquid, and NMP were added to prepare a slurry having a solid content of 83%. The slurry was stirred for one hour, and NMP was further added to reduce the solid content to 78%. The resulting slurry was stirred for 10 minutes to give a slurry composition for a positive electrode of a lithium ion secondary battery. The slurry composition had a viscosity of 3,660 mPa.s and exhibited a change in slurry sedimentation of 3.3% as measured after 24 hours. Using the slurry composition, an electrode and further a secondary battery were manufactured. Properties of the electrode and the secondary battery were evaluated. The results are shown in Table 5.

EXAMPLES 11-14, COMPARATIVE EXAMPLES 4-8

By the same procedures as described in Example 10, slurry compositions were prepared except that ingredients shown in Table 5 were used in amounts shown in Table 5 with all other conditions remaining the same. Using the slurry compositions, electrodes and further secondary batteries were manufactured. Properties of the electrodes and the secondary batteries were evaluated. The results are shown in Table 5.

In Comparative Example 4, the binding force was insufficient and cracks occurred in the electrode, and therefore, properties of the secondary battery could not be measured.

EXAMPLE 15

A solution of 0.8 part of polymer (X-10) in NMP was mixed together with a dispersion of 1.5 parts of polymer (Z) in NMP. To the mixed liquid, 100 parts of lithium cobaltate as active material for electrode and 5 parts of acetylene black (HS-100 available from Denki Kagaku Kogyou K.K.) as electrical conductivity-imparting agent were added, and NMP was further added in an amount such that the mixture had a solid content of 75%. The mixture was stirred by a planetary mixer to give a uniform slurry for positive electrode. Using the slurry, a positive electrode, and further a secondary battery were manufactured. Peel strength of the positive electrode, and capacity of the secondary battery at 30° C. and charge-discharge cycle characteristics and charge-discharge rate characteristics were evaluated at 60° C. The results are shown in Table 6.

EXAMPLES 16-22, COMPARATIVE EXAMPLES 9, 10

The procedures as described in Example 15 were repeated except that the polymers shown in Table 6 were used with all other conditions remaining the same. The results of evaluation of properties of electrodes and secondary batteries are shown in Table 6.

TABLE 5

|  | Example | | | | | Comparative Example | | | | |
| --- | --- | --- | --- | --- | --- | --- | --- | --- | --- | --- |
|  | 10 | 11 | 12 | 13 | 14 | 4 | 5 | 6 | 7 | 8 |
| Polymer X | X-15 | X-15 | X-16 | X-16 | X-17 | — | — | — | — | X'-4 |
| Amount (parts) | 0.2 | 0.2 | 0.4 | 0.2 | 0.5 | — | — | — | — | 0.2 |
| Polymer Y | Y-1 | Y-2 | Y-1 | Y-3 | Y-1 | — | — | Y-1 | Y-3 | Y-2 |
| Amount (parts) | 0.6 | 0.6 | 0.4 | 0.6 | 0.3 | — | — | 0.8 | 0.4 | 0.6 |
| Other binder *1 | — | — | — | — | — | PVDF | PVDF | — | PVDF | — |
| Amount (parts) | — | — | — | — | — | 2 | 6 | — | 0.4 | — |
| Slurry sedimentation *2 (%) | 3.3 | 2.8 | 2.4 | 3.5 | 1.1 | 10.6 | 2.2 | 1.2 | 9.3 | 5.5 |
| Peel strength (N/cm) | 0.25 | 0.21 | 0.32 | 0.19 | 0.25 | 0.06 | 0.24 | 0.11 | 0.08 | 0.18 |
| Battery capacity (mAh/g) | 144 | 141 | 142 | 140 | 140 | NM *3 | 132 | 141 | 130 | 135 |
| Cycle characteristics *4 (%) | 72 | 69 | 73 | 66 | 70 | NM *3 | 55 | 44 | 42 | 47 |
| Rate characteristics *5 (%) | 68 | 66 | 67 | 64 | 65 | NM *3 | 30 | 63 | 38 | 42 |

*1 PVDF: Polyvinylidene fluoride
*2 Sedimentation of slurry
*3 Not measurable
*4 Charge-discharge cycle characteristics of battery
*5 Charge-discharge rate characteristics of battery

TABLE 6

| | Example | | | | | | | | Comp. Ex. | |
|---|---|---|---|---|---|---|---|---|---|---|
| | 15 | 16 | 17 | 18 | 19 | 20 | 21 | 22 | 9 | 10 |
| Polymer X | X-10 | X-11 | X-12 | X-13 | X-14 | X-10 | X-10 | X-10 | X'-1 | X'-2 |
| Amount (parts) | 0.8 | 0.8 | 0.8 | 0.8 | 0.8 | 0.8 | 0.8 | 0.8 | 0.8 | 0.8 |
| Polymer Z | Z-1 | Z-1 | Z-1 | Z-1 | Z-1 | Z-2 | Z-3 | Z-4 | Z-1 | Z-1 |
| Amount (parts) | 1.5 | 1.5 | 1.5 | 1.5 | 1.5 | 1.5 | 1.5 | 1.5 | 1.5 | 1.5 |
| Peel strength (N/cm) | 0.34 | 0.32 | 0.36 | 0.33 | 0.30 | 0.33 | 0.32 | 0.29 | 0.21 | 0.24 |
| Battery capacity (mAh/g) | 144 | 142 | 142 | 141 | 141 | 143 | 142 | 138 | 135 | 132 |
| Cycle characteristics *1 (%) | 65 | 66 | 62 | 60 | 61 | 65 | 63 | 52 | 40 | 32 |
| Rate characteristics *2 (%) | 44 | 40 | 43 | 40 | 42 | 42 | 44 | 35 | 29 | 25 |

*1 Charge-discharge cycle characteristics of battery
*2 Charge-discharge rate characteristics of battery

EXAMPLE 23

By procedures similar to those as described in Example 10, a slurry composition for an electrode for lithium ion secondary battery was prepared wherein the following procedures are carried out with all other conditions remaining the same. 100 parts of lithium cobaltate and 0.4 part of polymer (Z-5) were mixed together with NMP to prepare a liquid dispersion having a solid content of 87%. A solution of 0.2 part of polymer (X-15) in NMP and a solution of 0.2 part of polymer (Y-1) in NMP were mixed together with 3 parts of acetylene black to prepare a carbon coating liquid. The carbon coating liquid was added to the above-mentioned liquid dispersion to prepare the slurry composition.

The slurry composition for an electrode for lithium ion secondary battery had a viscosity of 2,400 mPa.s·s and exhibited a change in slurry sedimentation of 2.5%. Using the slurry composition, an electrode and further a secondary battery were manufactured. Properties of the electrode and the secondary battery were evaluated at 25° C. The results are shown in Table 7.

TABLE 7

| | Example | | | | | |
|---|---|---|---|---|---|---|
| | 23 | 24 | 25 | 26 | 27 | 28 |
| Polymer X | X-15 | X-16 | X-16 | X-17 | X-7 | X-1 |
| Amount (parts) | 0.2 | 0.2 | 0.3 | 0.4 | 0.2 | 0.2 |
| Polymer Y | Y-1 | Y-2 | Y-2 | Y-1 | Y-1 | Y-1 |
| Amount (parts) | 0.2 | 0.3 | 0.1 | 0.2 | 0.2 | 0.2 |
| Polymer Z | Z-5 | Z-5 | Z-6 | Z-7 | Z-8 | Z-9 |
| Amount (parts) | 0.4 | 0.3 | 0.4 | 0.2 | 0.4 | 0.4 |
| Slurry sedimentation (%) | 2.5 | 2.1 | 2.8 | 2.7 | 2.2 | 2.5 |
| Peel strength (N/cm) | 0.32 | 0.31 | 0.33 | 0.30 | 0.32 | 0.33 |
| Battery capacity (mAh/g) | 142 | 143 | 145 | 142 | 144 | 143 |
| Cycle characteristics *1 (%) | 68 | 66 | 70 | 72 | 68 | 67 |
| Rate characteristics *2 (%) | 65 | 66 | 62 | 62 | 66 | 64 |

*1 Charge-discharge cycle characteristics of battery
*2 Charge-discharge rate characteristics of battery

EXAMPLES 24-28

Slurry compositions were prepared by the same procedures as described in Example 23 except that the ingredients shown in Table 7 were used in amounts shown in Table 7 with all other conditions remaining the same. Using the slurry compositions, electrodes and further secondary batteries were manufactured. Properties of the slurry compositions, the electrodes and the secondary batteries were evaluated. The results are shown in Table 7.

As seen from the above-mentioned working examples, an electrode manufactured from the slurry composition of the present invention exhibits a high peel strength and thus a polymer binder exhibits an enhanced binding performance even when the amount of a polymer binder is small. A lithium ion secondary battery provided with this electrode has a high capacity and exhibits good charge-discharge cycle characteristics and good charge-discharge rate characteristics.

INDUSTRIAL APPLICABILITY

The slurry composition for electrode of the present invention gives an electrode exhibiting low degree of swelling with an electrolyte liquid, and a binder polymer in the electrode has a high binding performance. Therefore, the slurry composition is suitable for the manufacture of various batteries and electrochemical capacitors.

The slurry composition is especially suitable for the manufacture of a positive electrode of a lithium ion secondary battery. The lithium ion secondary battery provided with this electrode keeps a high capacity at repetition of charge-discharge cycle, and exhibits good charge-discharge cycle characteristics and good charge-discharge rate characteristics.

The invention claimed is:

1. A slurry composition for an electrode comprising a binder, an active material for the electrode, and a liquid medium, characterized in that the binder comprises a polymer (X) comprising 60 to 95% by mole of repeating units derived from acrylonitrile or methacrylonitrile and 5 to 30% by mole of repeating units derived from at least one kind of monomer selected from 1-olefins and compounds represented by the following general formula (1):

$$CH_2=CR^1-COOR^2 \quad (1)$$

wherein $R^1$ represents a hydrogen atom or a methyl group and $R^2$ represents an alkyl group; and the liquid medium is capable of dissolving the polymer (X).

2. The slurry composition for an electrode according to claim 1, wherein the binder further comprises a polymer (Y) having a glass transition temperature in the range of −80 to 0° C. and containing not larger than 5% by weight of N-methyl-pyrrolidone-insoluble matter, and the ratio in content of the polymer (X) to the polymer (Y) is in the range of 1/10 to 10/1 by weight.

3. The slurry composition for an electrode according to claim 2, wherein the polymer (Y) is a hydrogenation product of an acrylonitrile-butadiene copolymer.

4. The slurry composition for an electrode according to claim 1, wherein the binder further comprises a polymer (Z) having a glass transition temperature in the range of −80 to 0° C. and containing at least 50% by weight of N-methyl-pyrrolidone-insoluble matter, and the ratio in content of the polymer (X) to the polymer (Z) is in the range of 1/10 to 10/1 by weight.

5. The slurry composition for an electrode according to claim 4, wherein the polymer (Z) is an acrylic rubber.

6. The slurry composition for an electrode according to claim 1,
wherein the binder further comprises a polymer (Y) and a polymer (Z), each of said polymers (Y) and (Z) having a glass transition temperature in the range of −80 to 0° C.,
wherein the polymer (Y) contains no larger than 5% by weight of N-methyl-pyrrolidone-insoluble matter and the polymer (Z) contains at least 50% by weight of N-methyl-pyrrolidone-insoluble matter, and
the ratio in content of the sum of the polymer (X) plus the polymer (Y) to the polymer (Z) is in the range of 5/1 to 1/5 by weight.

7. The slurry composition for an electrode according to claim 6, wherein the polymer (Y) is a hydrogenation product of an acrylonitrile-butadiene copolymer.

8. The slurry composition for an electrode according to claim 6, wherein the polymer (Z) is an acrylic rubber.

9. The slurry composition for an electrode according to claim 1, wherein the liquid medium is N-methyl-pyrrolidone.

10. A method of manufacturing a positive electrode of a lithium ion secondary battery, said method comprising the steps of coating a collector with the slurry composition as claimed in any one of claims 1 to 6, and then drying the thus-formed coating to form the positive electrode.

11. An electrode comprising a mixed material layer comprising at least a binder and an active material for an electrode, which layer is bonded to a collector, characterized in that the binder comprises a polymer (X) comprising 60 to 95% by mole of repeating units derived from acrylonitrile or methacrylonitrile and 5 to 30% by mole of repeating units derived from at least one kind of a monomer selected from 1-olefins and compounds represented by the following general formula (1):

$$CH_2=CR^1-COOR^2 \qquad (1)$$

wherein $R^1$ represents a hydrogen atom or a methyl group and $R^2$ represents an alkyl group; and the liquid medium is capable of dissolving the polymer (X).

12. The electrode according to claim 11, Wherein the binder further comprises a polymer (Y) having a glass transition temperature in the range of −80 to 0° C. and containing not larger than 5% by weight of N-methyl-pyrrolidone-insoluble matter, and the ratio in content of the polymer (X) to the polymer (Y) is in the range of 1/10 to 10/1 by weight.

13. The electrode according to claim 11, wherein the binder further comprises a polymer (Z) having a glass transition temperature in the range of −80 to 0° C. and containing at least 50% by weight of N-methyl-pyrrolidone-insoluble matter, and the ratio in content of the polymer (X) to the polymer (Z) is in the range of 1/10 to 10/1 by weight.

14. The electrode according to claim 11, wherein the binder further comprises a polymer (Y) and a polymer (Z), both of which have a glass transition temperature in the range of −80 to 0° C., Wherein the polymer (Y) contains not larger than 5% by weight of N-methyl-pyrrolidone-insoluble matter, the polymer (Z) contains at least 50% by weight of N-methyl-pyrrolidone-insoluble matter, and the ratio in content of the sum of the polymer (X) plus the polymer (Y) to the polymer (Z) is in the range of 5/1 to 1/5 by weight.

15. A secondary battery having an electrode as claimed in claim 11.

* * * * *